(12) United States Patent
Abrishamkar et al.

(10) Patent No.: US 7,061,882 B2
(45) Date of Patent: Jun. 13, 2006

(54) PILOT ESTIMATION USING PREDICTION ERROR METHOD-SWITCHED FILTERS

(75) Inventors: Farrokh Abrishamkar, San Diego, CA (US); Kartik B. Ariyur, Minnetonka, MN (US); Kenneth Kreutz-Delgado, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 70 days.

(21) Appl. No.: 10/643,639

(22) Filed: Aug. 18, 2003

(65) Prior Publication Data

US 2004/0179496 A1 Sep. 16, 2004

Related U.S. Application Data

(60) Provisional application No. 60/454,378, filed on Mar. 12, 2003.

(51) Int. Cl.
*H04B 7/216* (2006.01)

(52) U.S. Cl. ............ 370/320; 370/335; 370/342; 375/232; 375/346

(58) Field of Classification Search .......... 370/320, 370/335, 342; 375/346, 350, 232, 233; 382/260
See application file for complete search history.

(56) References Cited

FOREIGN PATENT DOCUMENTS

WO    WO03015364    * 12/1899
WO    03015364    2/2003

OTHER PUBLICATIONS

XP-002254352, Channel Estimation for 3G Wideband CDMA Systems Using the Kalam Filter Algorithm, K. Sam Shanm ugan.*
Massicotte et al (US 2004/0136444), Cascade Filter Receiver for DS-CDMA Communication Systems.*
Subrahmanya et al (US 2003/0072277), Adaptive Pilot Filter for a Wireless Communication Systems.*
Shanmugan, K. (2000) Channel estimation for 3G wideband CDMA systems using the kalman filtering algorithm. IEEE pp. 95-97, XP002254352.

* cited by examiner

*Primary Examiner*—Dang Ton
*Assistant Examiner*—Inder Pal Mehra
(74) *Attorney, Agent, or Firm*—Philip R Wadsworth; Charles D Brown; Kenyon Jackson (57) ABSTRACT

A system is disclosed for use in a wireless communication system to provide an estimated pilot signal. The system includes a receiver and a front-end processing and despreading component in electronic communication with the receiver for despreading a CDMA signal. A pilot estimation component is in electronic communication with the front-end processing and despreading component for estimating an original pilot signal using a pilot estimator that includes more than one filter and that includes a switching method for using the more than one filter. The switching method uses a prediction error. A demodulation component is in electronic communication with the pilot estimation component and the front-end processing and despreading component for providing demodulated data symbols.

18 Claims, 7 Drawing Sheets

PILOT ESTIMATION USING PREDICTION ERROR METHOD-SWITCHED FILTERS

RELATED APPLICATIONS

This application claims priority to U.S. Provisional Application No. 60/454,378, filed on Mar. 12, 2003.

CROSS-REFERENCE

The present invention is related to the following Applications for Patent in the U.S. Patent & Trademark Office which are incorporated by reference for all purposes:

"Method And Apparatus For Pilot Estimation Using Suboptimum Expectation Maximization" by Farrokh Abrishamkar et al., U.S. application Ser. No. 10/262,306, filed Sep. 30, 2002;

"Method And Apparatus For Pilot Estimation Using A Wiener Filter" by Farrokh Abrishamkar et al., U.S. application Ser. No. 10/262,010, filed Sep. 30, 2002;

"Method And Apparatus For Pilot Estimation Using A Prediction Error Method With A Kalman Filter And Pseudo-Linear Regression", by Farrokh Abrishamkar et al., U.S. application Ser. No. 10/262,111, filed Sep. 30, 2002;

"Method And Apparatus For Pilot Estimation Using A Prediction Error Method With A Kalman Filter And A Gauss-Newton Method", by Farrokh Abrishamkar et al., U.S. application Ser. No. 10/262,044, filed Sep. 30, 2002;

"Method And Apparatus For Pilot Estimation Using An Adaptive Prediction Error Method With A Kalman Filter And A Gauss-Newton Method" by Farrokh Abrishamkar et al., U.S. application Ser. No. 10/262,112, filed Sep. 30, 2002; and "Method And Apparatus For Pilot Estimation Using Prediction Error Method" by Farrokh Abrishamkar et al., U.S. application Ser. No. 10/279,535, filed Oct. 23, 2002.

FIELD

The present invention relates to wireless communication systems generally and specifically, to methods and apparatus for estimating a pilot signal in a code division multiple access system.

BACKGROUND

In a wireless radiotelephone communication system, many users communicate over a wireless channel. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. Commonly in a CDMA wireless communication system, such as that described in EIA/TIA IS-95, the pilot signal is a "beacon" transmitting a constant data value and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

Recently, third-generation (3G) wireless radiotelephone communication systems have been proposed in which a reverse-link (mobile station to base station) pilot channel is used. For example, in the currently proposed cdma2000 standard, the mobile station transmits a Reverse Link Pilot Channel (R-PICH) that the base station uses for initial acquisition, time tracking, rake-receiver coherent reference recovery, and power control measurements.

Pilot signals can be affected by noise, fading and other factors. As a result, a received pilot signal may be degraded and different than the originally transmitted pilot signal. Information contained in the pilot signal may be lost because of noise, fading and other factors.

There is a need, therefore, to process the pilot signal to counter the effects of noise, fading and other signal-degrading factors.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of a data-driven pilot estimator by first discussing a spread-spectrum wireless communication system. The methodology for the systems herein includes modeling the Doppler spectrum as more than one subchannel and using more than one filter, where each filter is tuned for a particular subchannel. Components of an embodiment of a mobile station are shown in relation to providing a pilot estimate. Included in the specification are illustrations and mathematical derivations for a Prediction Error Method (PEM) based pilot estimator. A switching method for using the multiple filters is disclosed. Exemplary formulas and calculations for the real-time pilot estimation are illustrated.

Note that exemplary embodiments are provided as exemplars throughout this discussion, however, alternate embodiments may incorporate various aspects without departing from the scope of the present invention.

One exemplary embodiment employs a spread-spectrum wireless communication system. Wireless communication systems are widely deployed to provide various types of communication such as voice, data, and so on. These systems may be based on CDMA, TDMA, or some other modulation techniques.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard.

Figure 1:
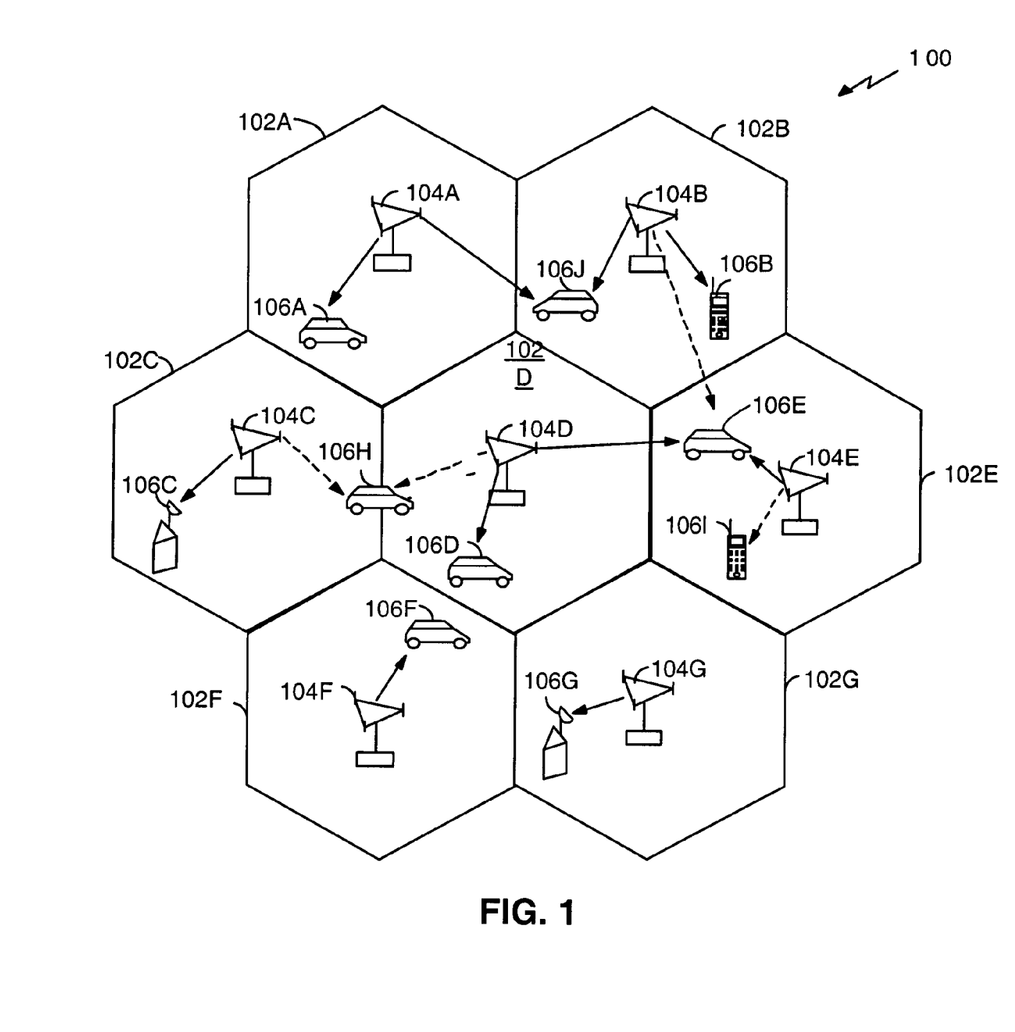
FIG. 1 is a diagram of a spread spectrum communication system that supports a number of users.

FIG. 1 serves as an example of a communications system 100 that supports a number of users and is capable of implementing at least some aspects of the concepts discussed herein. Any of a variety of methods may be used to schedule transmissions in system 100. System 100 provides communication for a number of cells 102A–102G, each of which is serviced by a corresponding base station 104A–104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
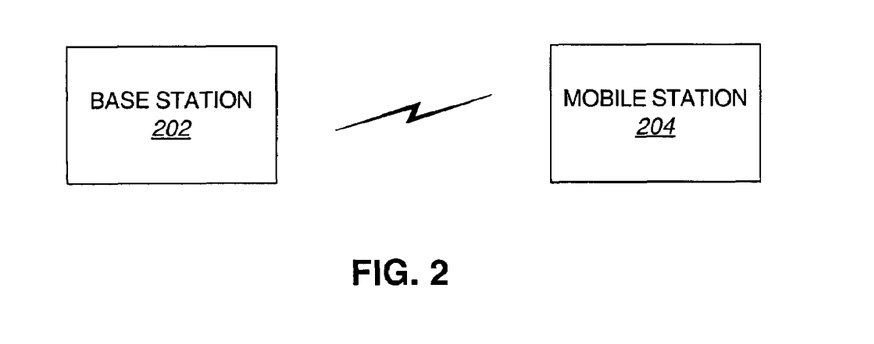
FIG. 2 is a block diagram of a base station and a mobile station in a communications system.

FIG. 2 is a block diagram of the base station 202 and mobile station 204 in a communications system. A base station 202 is in wireless communications with the mobile station 204. As mentioned above, the base station 202 transmits signals to mobile stations 204 that receive the signals. In addition, mobile stations 204 may also transmit signals to the base station 202.

Figure 3:
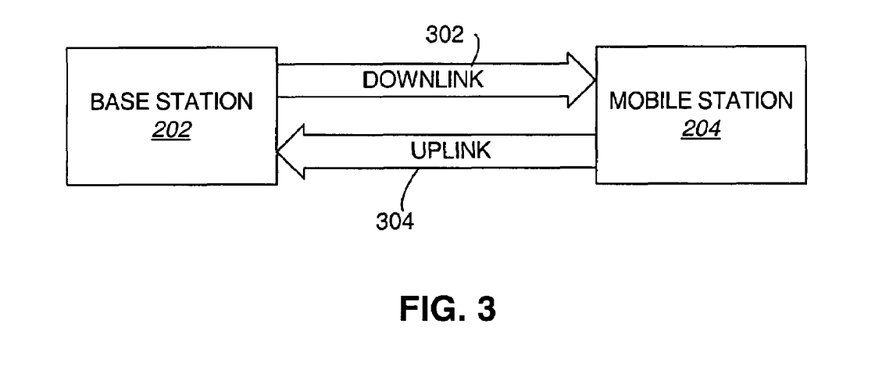
FIG. 3 is a block diagram illustrating the downlink and the uplink between the base station and the mobile station.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

Figure 4:
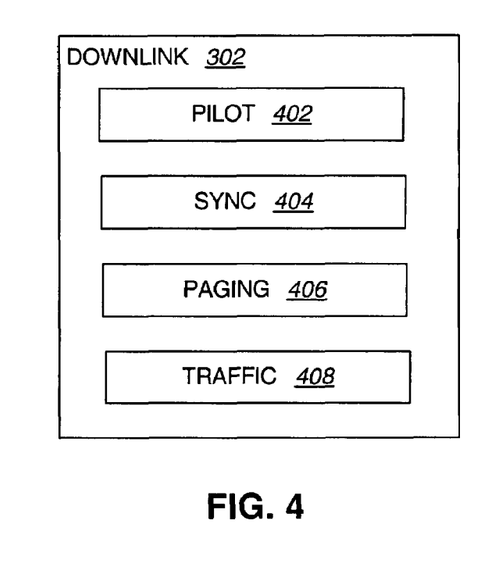
FIG. 4 is a block diagram of the channels in an embodiment of the downlink.

FIG. 4 is a block diagram of channels in an embodiment of the downlink 302. The downlink 302 includes a pilot channel 402, a sync channel 404 a paging channel 406 and a traffic channel 408. The downlink 302 illustrated is only one possible embodiment of a downlink and it will be appreciated that other channels may be added or removed from the downlink 302.

Although not illustrated, the uplink 304 may also include a pilot channel. Recall that third-generation (3G) wireless radiotelephone communication systems have been proposed in which an uplink 304 pilot channel is used. For example, in a currently proposed cdma2000 standard, the mobile station transmits a Reverse Link Pilot Channel (R-PICH) that the base station uses for initial acquisition, time tracking, rake-receiver coherent reference recovery, and power control measurements. Systems and methods herein may be used to estimate a pilot signal whether on the downlink 302 or on the uplink 304.

Under one CDMA standard, described in the Telecommunications Industry Association's TIA/EIA/IS-95-A Mobile Stations-Base Station Compatibility Standard for Dual-Mode Wideband Spread Spectrum Cellular System, each base station 202 transmits pilot 402, sync 404 paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202, for example to determine when to hand off between base stations 202 (such as when moving between cells).

Figure 5:
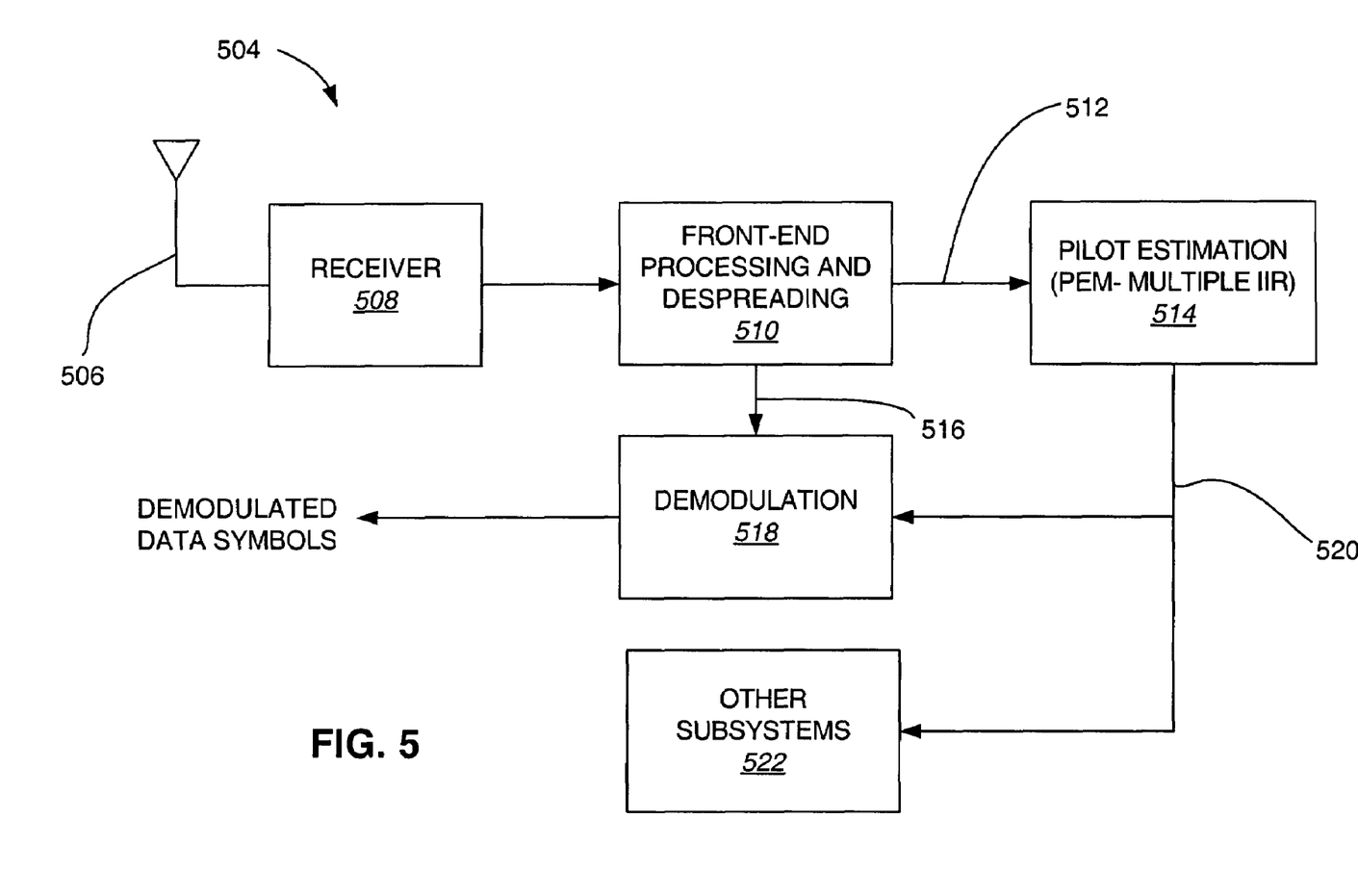
FIG. 5 illustrates a block diagram of certain components in an embodiment of a mobile station.

FIG. 5 illustrates a block diagram of certain components in an embodiment of a mobile station 504. Other components that are typically included in the mobile station 504 may not be illustrated for the purpose of focusing on the novel features of the embodiments herein. Many embodiments of mobile stations 504 are commercially available and, as a result, those skilled in the art will appreciate the components that are not shown.

If the pilot channel 402 were being sent on the uplink 304, the components illustrated may be used in a base station 202 to estimate the pilot channel. It is to be understood that the inventive principles herein may be used with a variety of components to estimate a pilot whether the pilot is being received by a mobile station 504, a base station 202, or any other component in a wireless communications system. Thus, the embodiment of a mobile station 504 is an exemplary embodiment of the systems and methods but it is understood that the systems and methods may be used in a variety of other contexts.

Referring again to FIG. 5, a spread spectrum signal is received at an antenna 506. The received spread spectrum signal is provided by the antenna 506 to a receiver 508. The receiver 508 down-converts the signal and provides the down converted signal to the front-end processing and despreading component 510. The front-end processing and despreading component 510 extracts the received pilot signal from the down converted signal and provides the received pilot signal 512 to the pilot estimation component 514. The received pilot signal 512 commonly includes noise and degradation from fading.

The front-end processing and despreading component 510 also provides the traffic channel 516 to a demodulation component 518 that demodulates the data symbols.

The pilot estimation component 514 provides an estimated pilot signal 520 to the demodulation component 518. The pilot estimation component 514 uses Prediction Error Method (PEM) and multiple Infinite Impulse Response (IIR) filters, as will be further discussed below. The pilot estimation component 514 may also provide the estimated pilot signal 520 to other subsystems 522.

It will be appreciated by those skilled in the art that additional processing takes place at the mobile station 504. The embodiment of the pilot estimation component 514 will be more fully discussed below. Generally, the pilot estimation component 514 operates to estimate the pilot signal and effectively clean-up the pilot signal by reducing the noise and estimating the original pilot signal that was transmitted.

Systems and methods disclosed herein use a Kalman filter to estimate the pilot signal. Kalman filters are known by those skilled in the art. In short, a Kalman filter is an optimal recursive data processing method. A Kalman filter takes as inputs data relevant to the system and estimates the current value(s) of variables of interest. A number of resources are currently available that explain in detail the use of Kalman filters. A few of these resources are "Fundamentals of Kalman Filtering: A Practical Approach" by Paul Zarchan and Howard Musoff, "Kalman Filtering and Neural Networks" by Simon Haykin and "Estimation and Tracking: Principles, Techniques And Software" by Yaakov Bar-Shalom and X. Rong Li, all of which are incorporated herein by reference.

Multiple IIR filters are used to estimate the pilot signal. An exemplary system using two IIR filters will be illustrated and discussed. However, it will be appreciated that more than two IIR filters could also be used by following the principles set forth herein.

Figure 6:
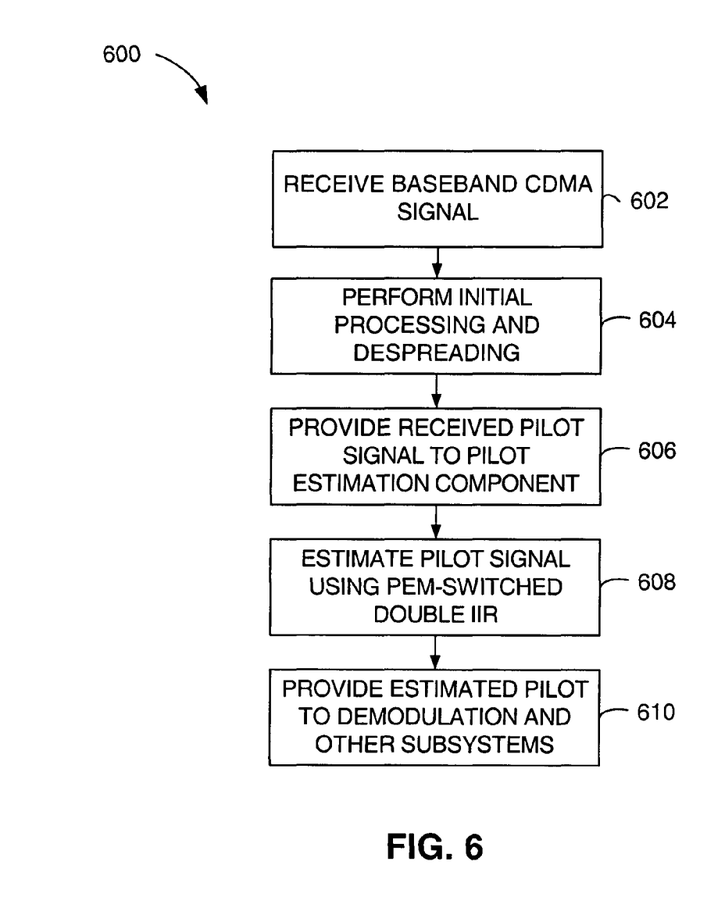
FIG. 6 is a flow diagram of an embodiment of a method for estimating the pilot using a switched double IIR (Infinite Impulse Response) filter.

FIG. 6 is a flow diagram 600 of one embodiment of a method for estimating the pilot using a PEM-switched double IIR. The system receives 602 the baseband CDMA signal. Then the front-end processing and despreading component 510 performs initial processing and despreading 604. The received pilot signal is then provided 606 to the pilot estimation component 514. The received pilot signal has been degraded by various effects, including noise and fading. The pilot estimation component 514 estimates 608 the pilot channel using the PEM-switched double IIR. After the pilot has been estimated 608, it is provided 610 to the demodulation component 518 as well as other subsystems 522.

Figure 7:
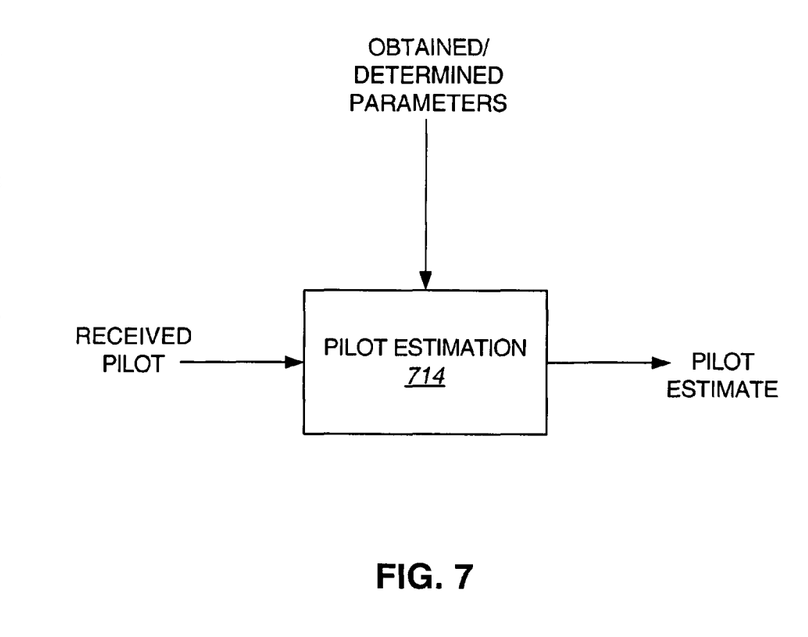
FIG. 7 is a block diagram illustrating the inputs to and outputs from a pilot estimation component.

Referring now to FIG. 7, before the PEM-switched double IIR in the pilot estimation component 514 is used, several parameters that may be used by the PEM-switched double IIR are obtained and/or determined. These determined parameters may include initial conditions, empirically determined values, etc., as discussed below. The obtained or determined parameters are provided to the pilot estimation component 714 and its PEM-switched double IIR, to process the received pilot and estimate the original pilot in real time.

In this embodiment, a PEM is used. Unlike Least Mean Square (LMS) or Minimum Mean Square Error (MMSE)-based estimators, PEM does not need a preamble. PEM is completely data driven and can be used in blind communication receivers.

The following discussion provides details regarding the calculations that will be made in the pilot estimation component 714. Additional details and derivations known by those skilled in the art are not included herein.

The received pilot complex envelope after despreading is given by the following formula:

$$\tilde{y}_k = \tilde{s}_k + \tilde{v}_k \qquad \text{Formula 1.}$$

The received complex envelope in Formula 1 is represented as $\tilde{y}_k$. The original but faded pilot signal is represented as $\tilde{s}_k$. The noise component is represented as $\tilde{v}_k$. For a single path mobile communication channel, the original pilot signal may be represented by the mathematical model found in Formula 2. The corresponding noise component may be represented by the formula found in Formula 3.

$$\tilde{s}_k = \rho_k e^{j\phi_k} R_{hh}(\tau) = g_k N \sqrt{E_c^p}\, R_{hh}(\tau) \tilde{f}_k \qquad \text{Formula 2.}$$

$$\tilde{v}_k = g_k \sqrt{NI_{oc}}\, \tilde{n}_k + g_k \sqrt{NI_{or}} \sum_{m=-\infty, m\neq k}^{+\infty} R_{hh}(mT_c - \tau) \tilde{w}_k \qquad \text{Formula 3.}$$

The variables and parameters in the formulas found in Formulas 2 and 3 are given in Table 1.

TABLE 1

| | |
|---|---|
| $\sqrt{E^p}$: | Pilot Envelope |
| $I_{oc}$: | Total AWGN Noise |
| $I_{or}$: | Total Transmit PSD |
| $g_k$: | AGC Control Signal |
| $\rho_k$: | Rice (Rayleigh) Fade Process |
| $f_k$: | Complex Gaussian Fade Process with Clark Spectrum |
| $\phi_k$: | Fading Phase |
| m, k: | Chip and Symbol Counts |
| N: | Processing Gain |

TABLE 1-continued

| $R_{hh}(\tau)$: | Correlation |
|---|---|
| $\tau$: | Time Offset |
| $\tilde{n}k, \tilde{w}k$: | Zero Mean Unit Power Gaussian Noise |

The demodulation component 518 requires the phase of the pilot signal. In order to obtain the phase, the signals may be written in a form comprising I and Q components rather than being written in an envelope form. In Formula 4, $\tilde{y}$ represents the received pilot comprising its I and Q components. The faded pilot, without any noise, is represented as $\tilde{s}$ in Formula 5. The total noise is represented in Formula 6 as $\tilde{v}$. Formula 7 illustrates the fade as $\tilde{f}$.

Since demodulation requires pilot phase, we are going to deal with I and Q instead of the envelope.

$$\tilde{y}=y_I+jy_Q \qquad \text{Formula 4.}$$

$$\tilde{s}=s_I+js_Q \qquad \text{Formula 5.}$$

$$\tilde{v}=v_I+jv_Q \qquad \text{Formula 6.}$$

$$\rho e^{j\phi}=f_I+jf_Q=\tilde{f} \qquad \text{Formula 7.}$$

Given the relationships of the formulas above, the I and Q components of the faded pilot symbol without noise may be written as shown in Formulas 8 and 9.

$$s_I(k)=f_I(k)N\sqrt{E_c^P}R_{hh}(\tau)g(k) \qquad \text{Formula 8.}$$

$$s_Q(k)=f_Q(k)N\sqrt{E_c^P}R_{hh}(\sigma)g(k) \qquad \text{Formula 9.}$$

State space and Kalman filtering techniques are used in implementing the present systems and methods. A first-order state space Markov model may be used including the equations as illustrated in Formulas 10 and 11. As shown by Formula 10, the Gauss Markov model has a pole at a. The parameters $w_k$ and $v_k$ are uncorrelated white noise processes. A corresponding steady-state Kalman filter is given by Formula 12. The pole for the Kalman filter is a(1−K) in Formula 12. The parameter K is the Kalman gain and may be obtained from the solution of an Algebraic Riccati Equation (ARE). In addition, the Kalman gain may be obtained by running the Kalman filter until it reaches a steady state.

$$x_k=ax_{k-1}+bw_k \qquad \text{Formula 10.}$$

$$y_k=x_k+v_k \qquad \text{Formula 11.}$$

$$\hat{x}_k^+=a(1-K)\hat{x}_{k-1}^+ +Ky_{kl} \qquad \text{Formula 12.}$$

The Kalman Filter filtered estimate was given by Formula 12. The equation of Formula 12 is an IIR filter. If a=1, the filter is a DC-unit gain IIR filter.

Different techniques may be used to compute a and K. For example, system identification, bandwidth matching or other techniques may be used to compute a and K. The switching method disclosed herein assumes an empirically estimated value.

Multiple IIR filters may be used to accomplish the pilot estimation. In one embodiment two IIR filters may be used. A switching method may be used to switch between the two IIR filters. For the embodiment with two IIR filters, one IIR filter may be used for low bandwidth and the other IIR filter may be used for higher bandwidth. The two IIR filters may have a=1 and K=$K_1,K_2$ to reflect the high bandwidth and low bandwidth IIR filters.

The parameters $\theta_1$ and $\theta_2$ may be used to represent the parameters of the associated models (given Kalman filter gains $K_1$, $K_2$). Each parameter $\theta_i$ is indicative that its respective filter has its own pole and its own gain. Then $\{\theta_i\}$ implies the relationships as shown by Formulas 13–15. The Kalman filter is shown by Formula 13. The predictor is shown in Formula 14. As stated earlier, the term a may be set to 1. The term a may be set to other values including, but not limited to, 0.9 or 0.95. Those skilled in the art may set a as needed by the particular design and implementation. The error is given in Formula 15.

The switching method may run both filters simultaneously or alternately. The switching method uses Prediction Error Method (PEM) Bayesian switching to accomplish soft switching (combining) of the two outputs.

$$\hat{x}_k^+(\theta_i)=(1-K_i)\hat{x}_{k-1}^+(\theta_i)+K_iy_k \qquad \text{Formula 13.}$$

$$\hat{x}_{k+1}(\theta_i)=a\,\hat{x}_k^+(\theta_i) \qquad \text{Formula 14.}$$

$$e_k(\theta_i)=y_{k+1}-\hat{x}_{k+1}(\theta_i) \qquad \text{Formula 15.}$$

The prediction error power is the cost associated with $\theta_i$. Formulas 16–19 provide useful background information relating to the Bayesian-PEM switching. The prediction error power is given by Formula 16. The Maximum A Posteriori Probability (MAP) selection of the IIR filter is determined through use of Formulas 17 and 18. The values of C and $C_1C_2K\,C_k$ are such that the probability sums to 1. The innovation variance of the $\theta_i$ model is given in Formula 19.

$$\hat{\Omega}_k(\theta_i)=\lambda\hat{\Omega}_{k-1}(\theta_i)+(1-\lambda)e_k^2(\theta_i) \qquad \text{Formula 16.}$$

$$P(\theta_i\mid Y_k)=C_k\Omega^{-\frac{k}{2}}e^{-\frac{k}{2}}\frac{\hat{\Omega}_k(\theta_i)}{\Omega(\theta_i)} \qquad \text{Formula 17.}$$

$$C=C_1C_2K\,C_k \qquad \text{Formula 18.}$$

$$\Omega(\theta_i)=E\{e(\theta_i)^2\} \qquad \text{Formula 19.}$$

Each of the IIR filters may perform the calculations as set forth in Formulas 20–23. The equation in Formula 20 illustrates the filtering. The equation in Formula 21 illustrates the prediction. The prediction error is shown in Formula 22. The equation in Formula 23 illustrates how to obtain the noise power or error variance.

$$\hat{s}_k^+(\theta_i)=a_i(1-K_i)\hat{s}_{k-1}^+(\theta_i)+K_iy_k\; i=1,2 \qquad \text{Formula 20.}$$

$$\hat{s}_{k+1}(\theta_i)=a_i\hat{s}_k(\theta_i)\;i=1,2 \qquad \text{Formula 21.}$$

$$e_k(\theta_i)=y_k-\hat{s}_k(\theta_i)\;i=1,2 \qquad \text{Formula 22.}$$

$$\hat{\Omega}_i[k]=\lambda\hat{\Omega}_i[k-1]+(1-\lambda)e_k^2(\theta_i)\;i=1,2 \qquad \text{Formula 23.}$$

$$0<\lambda<1$$

The equation in Formula 24 indicates one way to determine the posteriori probabilities. The metric may be determined according to Formula 25. The parameter $\beta$ is the hardness parameter. The hardness parameter may be empirically determined by those skilled in the art as needed by the particular design and implementation. The MAP combining coefficients may be determined through use of the equations shown in Formulas 26 and 27. The PEM-MAP estimate is given in Formula 28. The solution of $\hat{s}_{k,MSE}^+$ of Formula 28 is the pilot estimate.

$$f[k] = \ln \frac{\Omega_1}{\Omega_2} - \frac{\hat{\Omega}_2[k]}{\Omega_2} + \frac{\hat{\Omega}_1[k]}{\Omega_1} \quad \text{Formula 24.}$$

$$L[k] = \frac{p(\theta_2 \mid y^k)}{p(\theta_1 \mid y^k)} = e^{\frac{\beta}{2}f[k]} \quad \text{Formula 25.}$$

$$\alpha_1 = p(\theta_1 \mid y^k) = \frac{1}{1 + L[k]} \quad \text{Formula 26.}$$

$$\alpha_2 = p(\theta_2 \mid y^k) = 1 - p(\theta_1 \mid y^k) \quad \text{Formula 27.}$$

$$\hat{s}_{k,MSE}^+ = \alpha_1 \hat{s}_k^+(\theta_1) + \alpha_2 \hat{s}_k^+(\theta_2) \quad \text{Formula 28.}$$

Soft or hard switching may be used in the system to switch between the IIR filters. The expressions in Formulas 29–32 illustrate an embodiment of calculations that may be used for soft switching or for an MMSE estimate.

$$\hat{s}_{k,MSE}^+ = E\{s_k \mid y^k\} \quad \text{Formula 29.}$$

$$= E\{E\{s_k \mid y^k; \theta_i\} \mid y^k\} \quad \text{Formula 30.}$$

$$= E\{\hat{s}_k^+(\theta_i) \mid y^k\} \quad \text{Formula 31.}$$

$$= \sum_{i=1}^{2} p(\theta_i \mid y^k) \hat{s}_k^+(\theta_i) \quad \text{Formula 32.}$$

The expressions in Formulas 33–34 illustrate an embodiment of calculations that may be used for hard switching or for a MAP-model signal estimate. In Formula 33 the parameter $\hat{\theta}_{MAP}[k]$ is equal to that shown in Formula 34.

$$\hat{s}_{k,MAP}^+ = \hat{s}_k^+(\hat{\theta}_{MAP}[k]) \quad \text{Formula 33.}$$

$$\hat{\theta}_{MAP}[k] = \arg\max p(\theta_i \mid y^k); \quad i = 1,2 \quad \text{Formula 34.}$$

Figure 8:
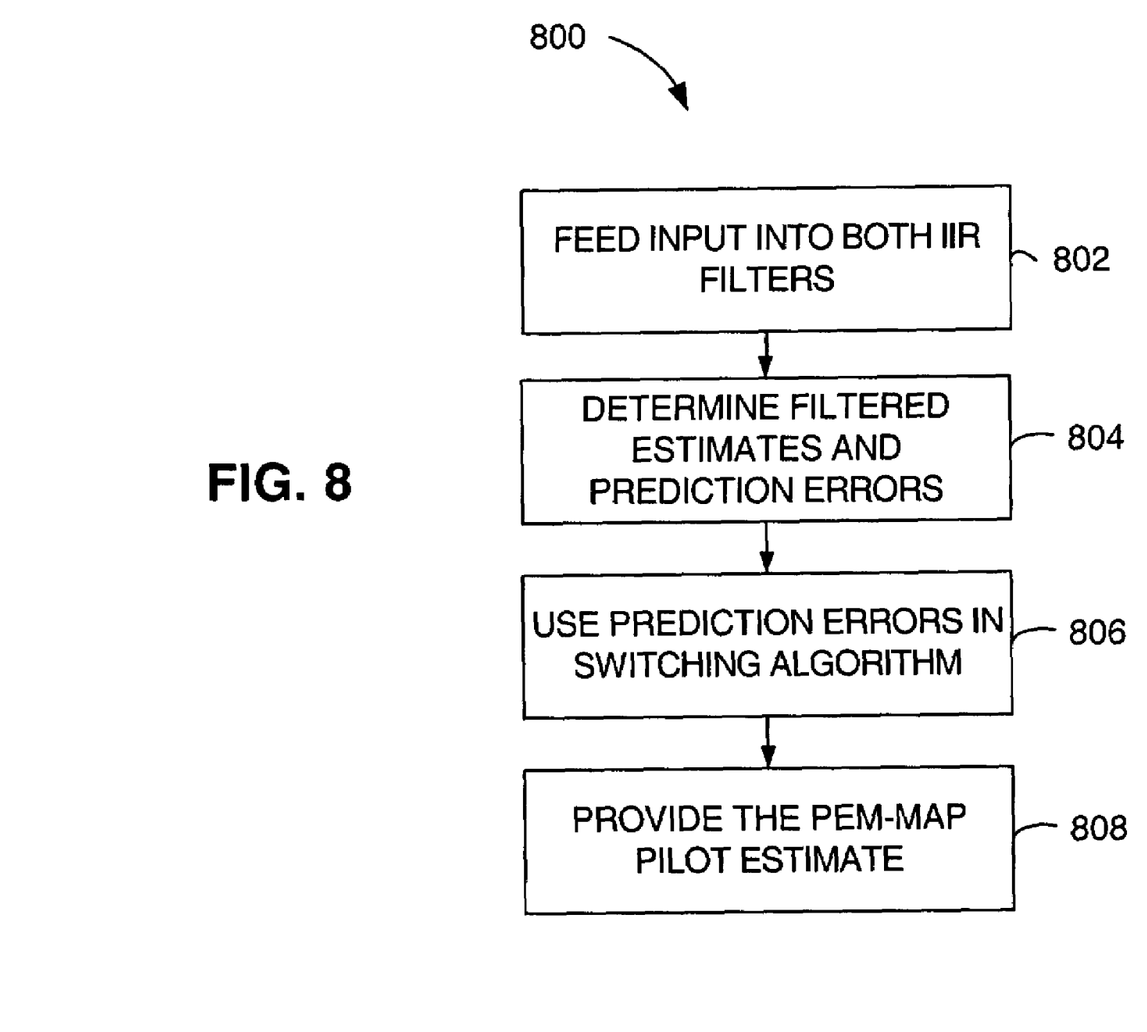
FIG. 8 is a flow diagram of an embodiment of a method for estimating the pilot using a switched double IIR filter.

FIG. 8 is a flow diagram illustrating an embodiment of a method for estimating a pilot signal using a PEM-switched double IIR. The input signal is fed 802 into both IIR filters. The IIR filters each determine 804 a filtered estimate and a prediction error. The prediction errors are used 806 to drive the switching mechanism. Finally, the PEM-MAP pilot estimate is provided 808.

Figure 9:
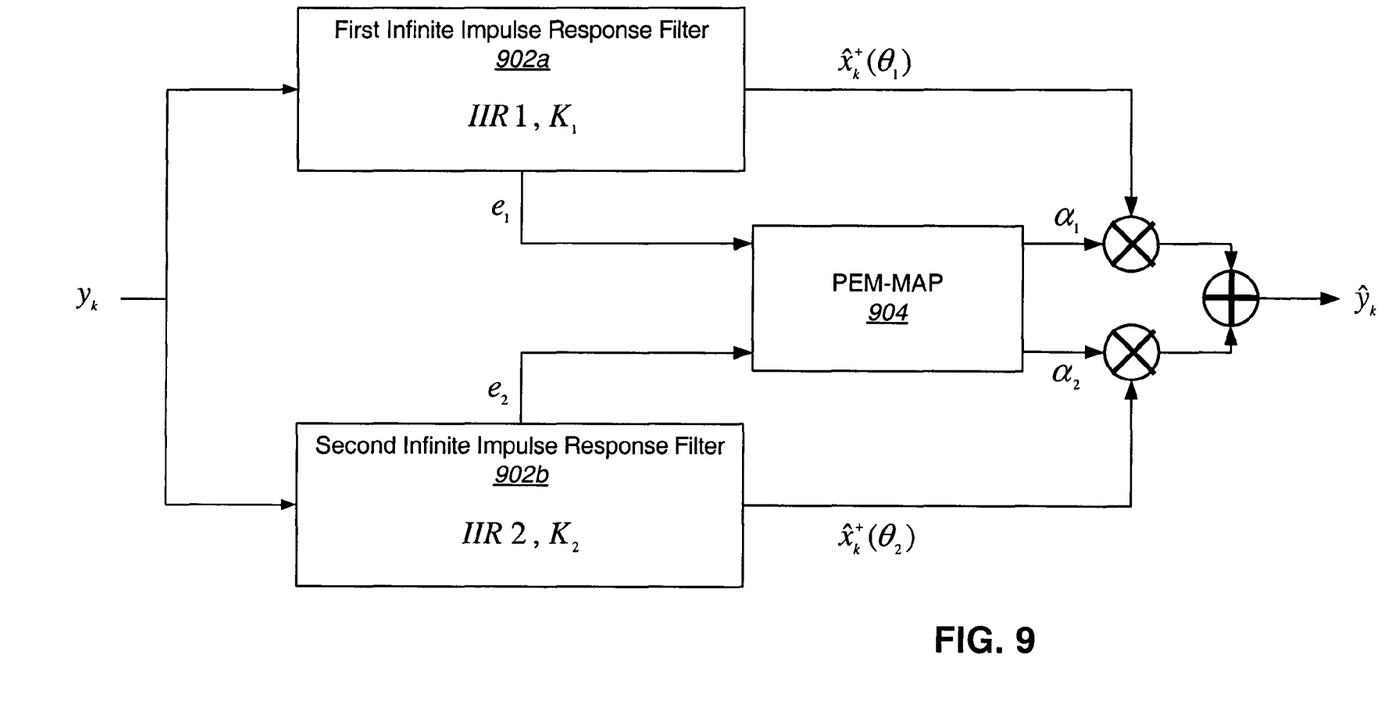
FIG. 9 is a block diagram illustrating an exemplary method for estimating the pilot using a switched double IIR filter.

FIG. 9 is a block diagram illustrating an example of the overall method. The input $y_k$ is fed into each IIR filter 902. The embodiment of FIG. 9 includes two IIR filters 902a, 902b. Each RIR filter 902 has a Kalman gain $K_i$. Each IIR filter 902 outputs a prediction error $e_i$ and a filtered output $\hat{x}_k^+$. The PEM-MAP component 904 determines the coefficients for $\alpha_1$ and $\alpha_2$. The pilot estimate is output from the method as shown and as illustrated by Formula 28.

Figure 10:
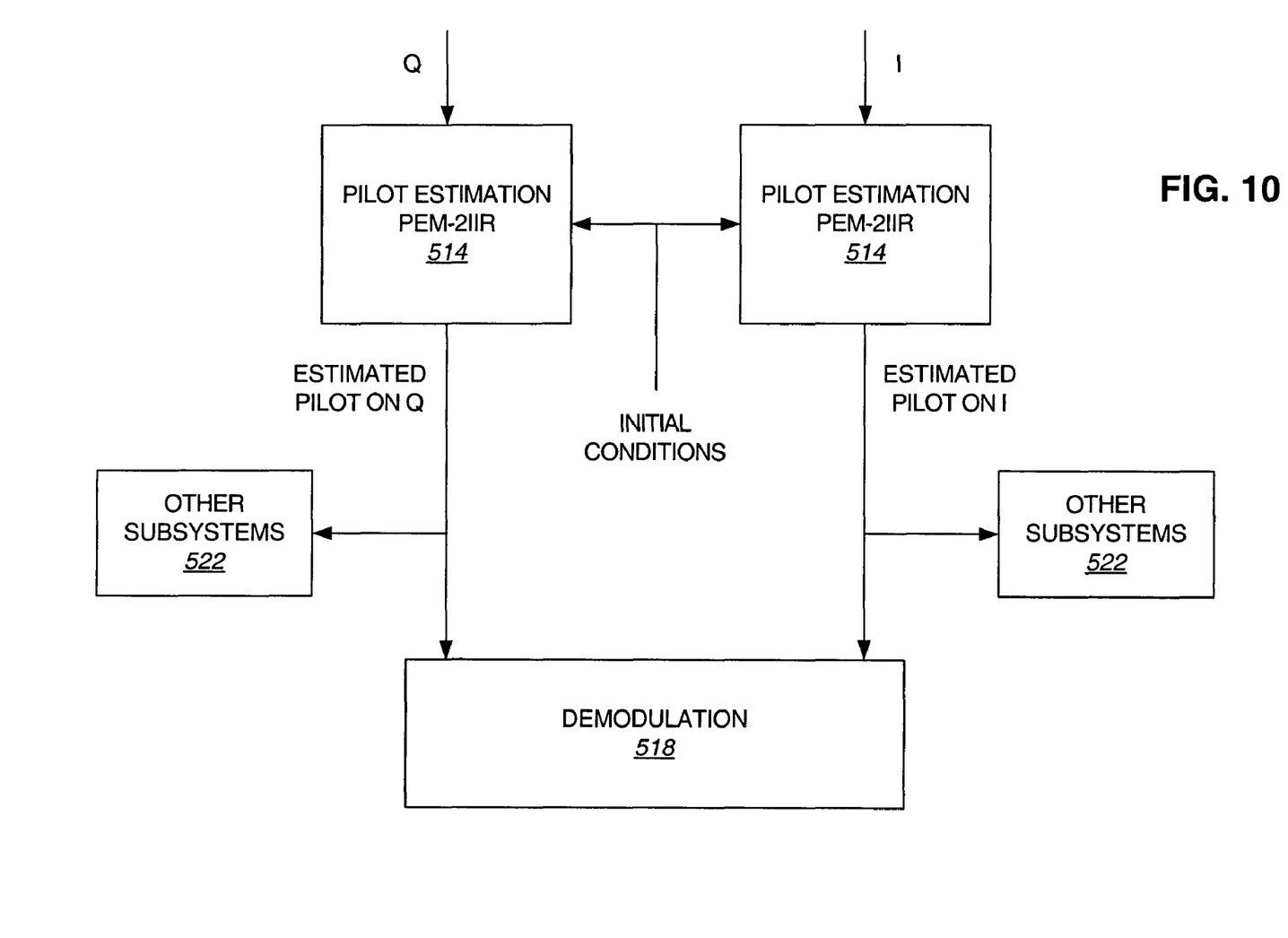
FIG. 10 is a block diagram of pilot estimation where the filtering is broken down into its I and Q components.

FIG. 10 is a block diagram of pilot estimation where the filtering is broken down into its I and Q components. The pilot estimation is achieved through using the switching method, as described above. Initial conditions are provided to the pilot estimation components 514. As shown, the processing for the I component is similar to the processing for the Q component. The particular component is provided to the pilot estimation component 514. The pilot estimation component 514 generates an estimated pilot for that component. The pilot estimate is then provided to the demodulation component 518 as well as other subsystems 522.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for estimating an original pilot signal, the method comprising:
   receiving a CDMA signal;
   obtaining a pilot signal from the CDMA signal; and
   estimating an original pilot signal using a pilot estimator having first and second filters and a switching component, each of the first and second filters generating from the pilot signal a filter estimate and prediction error, and wherein the switching component applies a combining coefficient to each of the filter estimates based on the filter estimate's prediction error, and combines the filter estimates to produce a pilot estimate.

2. The method as in claim 1, wherein the first and second filters each includes a Kalman filter.

3. The method as in claim 2, wherein the Kalman filters are implementing Infinite Impulse Response filters.

4. The method as in claim 3, wherein the switching component uses a first error variance to compute the coefficient to apply to the first filter estimate and a second error variance to compute the combining coefficient to apply to the second filter estimate.

5. The method as in claim 4, wherein the pilot estimate is obtained according to the following:

$$\hat{s}_{k,MSE}^+ = \alpha_1 \hat{s}_k^+(\theta_1) + \alpha_2 \hat{s}_k^+(\theta_2)$$

where
   $\hat{s}_{k,MSE}^+$ is the pilot estimate,
   $\alpha_1, \alpha_2$ are combining coefficients,
   $\hat{s}_k^+(\theta_1)$ is the first filtered estimate, and
   $\hat{s}_k^+(\theta_2)$ is the second filtered estimate.

6. The method as in claim 5, wherein each combining coefficient is obtained through use of a posteriori probabilities function obtained according to the following:

$$f[k] = \ln \frac{\Omega_1}{\Omega_2} - \frac{\hat{\Omega}_2[k]}{\Omega_2} + \frac{\hat{\Omega}_1[k]}{\Omega_1}$$

where
   $\hat{\Omega}_1$ is the first error variance, and
   $\hat{\Omega}_2$ is the second error variance.

7. The method as in claim 1, wherein the switching component uses a soft-switching method.

8. The method as in claim 1, wherein the switching component uses a bard-switching method.

9. The method as in claim 1, wherein the method is implemented in a mobile station.

10. A mobile station, comprising:
    a receiver for receiving a CDMA signal;
    a front-end processing and despreading component for obtaining a pilot signal from the CDMA signal; and
    a pilot estimation component having first and second filters and a switching component, each of the first and second filters generating from the pilot signal a filter estimate and prediction error, and wherein the switching component applies a combining coefficient to each of the filter estimates based on the filter estimate's prediction error, and combines the filter estimates to produce a pilot estimate.

11. The mobile station as in claim 10, wherein the first and second filters each includes a Kalman filter.

12. The mobile station as in claim 11, wherein the Kalman filters are implementing Infinite Impulse Response filters.

13. The mobile station as in claim 12, wherein the switching component uses a first error variance to compute the combining coefficient to apply to the first filter estimate and a second error variance to compute the combining coefficient to apply to the second filter estimate.

14. The mobile station as in claim 13, wherein the pilot estimate is obtained according to the following:

$$\hat{s}_{k,MSE}^+ = \alpha_1 \hat{s}_k^+(\theta_1) + \alpha_2 \hat{s}_k^+(\theta_2)$$

where
   $\hat{s}_{k,MSE}^+$ is the pilot estimate,
   $\alpha_1, \alpha_2$ are combining coefficients,
   $\hat{s}_k^+(\theta_1)$ is the first filtered estimate, and
   $\hat{s}_k^+(\theta_2)$ is the second filtered estimate.

15. The mobile station as in claim 14, wherein each combining coefficient is obtained through use of a posteriori probabilities function obtained according to the following:

$$f[k] = \ln \frac{\Omega_1}{\Omega_2} - \frac{\hat{\Omega}_2[k]}{\Omega_2} + \frac{\hat{\Omega}_1[k]}{\Omega_1}$$

where
   $\hat{\Omega}_1$ is the first error variance, and
   $\hat{\Omega}_2$ is the second error variance.

16. The mobile Station as in claim 10, wherein the switching component uses a soft-switching method.

17. The mobile station as in claim 10, wherein the switching component uses a bard-switching method.

18. A mobile station, comprising:
    means for receiving a CDMA signal;
    means for obtaining a pilot signal from the CDMA signal; and
    means for estimating an original pilot signal using a pilot estimator having first and second filters and a switching component, each of the first and second filters generating from the pilot signal a filter estimate and prediction error, and wherein the switching component applies a combining coefficient to each of the filter estimates based on the filter estimates prediction error, and combines the filter estimates to produce a pilot estimate.

* * * * *